(12) United States Patent
Hahn (10) Patent No.: US 7,086,060 B2
(45) Date of Patent: Aug. 1, 2006

(54) METHOD FOR PROGRAMMATIC REPRESENTATION AND ENFORCEMENT OF RESOURCE CONTROLS

(75) Inventor: Stephen C. Hahn, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 621 days.

(21) Appl. No.: 09/785,022

(22) Filed: Feb. 15, 2001

(65) Prior Publication Data

US 2002/0170045 A1  Nov. 14, 2002

(51) Int. Cl.
*G06F 9/46* (2006.01)

(52) U.S. Cl. ...................... 718/104; 718/102
(58) Field of Classification Search ........ 718/100–103, 718/104
See application file for complete search history.

(56) References Cited

U.S. PATENT DOCUMENTS

| | | | | |
|---|---|---|---|---|
| 5,410,703 A | * | 4/1995 | Nilsson et al. | 717/168 |
| 5,623,643 A | * | 4/1997 | Janssen et al. | 703/27 |
| 5,784,702 A | * | 7/1998 | Greenstein et al. | 711/173 |
| 5,809,230 A | * | 9/1998 | Pereira | 713/200 |
| 5,893,118 A | * | 4/1999 | Sonderegger | 707/203 |
| 5,915,085 A | * | 6/1999 | Koved | 726/1 |
| 5,949,876 A | * | 9/1999 | Ginter et al. | 705/80 |
| 6,202,208 B1 | * | 3/2001 | Holiday, Jr. | 717/166 |
| 6,324,688 B1 | * | 11/2001 | Brown et al. | 717/148 |
| 6,353,847 B1 | * | 3/2002 | Maruyama et al. | 718/105 |
| 6,487,455 B1 | * | 11/2002 | Balasubramanian | 700/2 |
| 6,931,544 B1 | * | 8/2005 | Kienhofer et al. | 717/118 |
| 2002/0060801 A1 | * | 5/2002 | Motamed et al. | 358/1.13 |

\* cited by examiner

*Primary Examiner*—Meng-Al T. An
*Assistant Examiner*—Syed J Ali
(74) *Attorney, Agent, or Firm*—Beyer Weaver & Thomas LLP (57) ABSTRACT

Methods, apparatus, and computer program products are disclosed for a process of dynamically adding new software having resource controls to an operating system and having the resource controls added to various resource control files in the operating system. The process also allows for a resource control to have an arbitrary number of limit values before a highest limit value is reached. A method of dynamically checking a resource control associated with newly added software to an operating system is described. A process or other type of entity in the operating system encounters newly added software and its associated resource control. The operating system then determines whether the resource associated with the resource control is active. If so, the operating system then determines whether usage of the resource by the entity exceeds a limiting value stored in the resource control. If so, one or more actions related to the resource are triggered by the operating system. If the limiting value has not been exceeded, granting the resource to the process or entity. At this time, the operating system can reset the limiting value of the resource control to another threshold value. In this manner, the process can have an arbitrary number of limiting values associated with the resource control.

26 Claims, 7 Drawing Sheets

METHOD FOR PROGRAMMATIC REPRESENTATION AND ENFORCEMENT OF RESOURCE CONTROLS

BACKGROUND OF THE INVENTION

The present invention relates to dynamically adding resources to an operating system.

A general requirement of modern operating systems is the ability to constrain the use of resources such as CPU cycles, memory allocations, and I/O bandwidth by specific entities on the system. Current systems perform this in a limited fashion, by restricting the entity seeking a resource control to a process (an executing computer program) and the available resource controls to an unchanging set of attributes. The advent of dynamically loadable operating system software can bring new features to the operating system that require new resource controls. Presently many resource control systems are not designed to handle such a dynamic change in resource controls.

Generally, programs executing in an operating system are presently unable to deal with added resources, i.e. resources added after booting the operating system. Specifically, existing programs executing under current operating systems are unaware of what resources may have been added and might be available to it. As a result, the number of resources are effectively fixed once the operating system has been booted. Examples of the types of fixed resources that have constraints include stack size, CPU space, address space, maximum file size, number of open files, and the maximum mapped memory for a process.

An example of an added resource is a scheduling algorithm that presented tunable values to each process it planned to schedule. The operating system could unload the scheduling algorithm from the operating system if no process or other entity was using it.

Requests for resources having constraints under current operating systems are made typically by the process (local entity) and result in fixed actions. That is, the entity will either get the signal for the resource or be denied the resource. Current operating systems have a fixed number of active limits on usage of a given resource. These active limits are typically described, for example, in UNIX systems as "soft" and "hard" values. That is, an active limit of a particular resource has a "soft" limit value and a "hard" limit value. Meeting or exceeding the lower of the two values (soft limit) triggers the action associated with it. For example, where the usage of memory space has reached the threshold of the "soft" limit, the program or process is denied the memory space resource. Oftentimes, however, it is desirable to have a progressive series of control limits to provide warnings that resource usage may be approaching the absolute limit set by an operating system and also to permit an administrator to monitor the resource usage.

Consequently, what is needed is a method for dynamically adding new software (i.e. functionality) to an operating system and having resource constraints (controls) dynamically recognizable to the operating system. Such a method would make the resources available to processes, tasks, or projects without rebooting the system. What is further needed is added flexibility in the operating system to allow a variable number of limiting values and actions associated with resource usage, to enable actions such as warnings or other monitoring actions to be provided to the process, the operating system, or an administrator and to allow a process to change the action associated with a control when appropriate.

SUMMARY OF THE INVENTION

According to the present invention, methods, apparatus, and computer program products are disclosed for a process of dynamically adding new software having resource controls to an operating system and having the resource controls be added to various resource control files in the operating system. The process also allows for a resource control to have an arbitrary number of limit values before a highest limit value is reached. In one aspect of the present invention, a method of dynamically checking a resource control associated with newly added software to an operating system is described. A process or other type of entity in the operating system encounters newly added software and its associated resource control. The operating system then determines whether the resource associated with the resource control is active. If so, the operating system then determines whether usage of the resource by the entity exceeds a limiting value stored in the resource control. If so, one or more actions related to the resource are triggered by the operating system. If the limiting value has not been exceeded, granting the resource to the process or entity. At this time, the operating system can reset the limiting value of the resource control to another threshold value. In this manner, the process can have an arbitrary number of limiting values associated with the resource control.

In one embodiment, the process searches a local set of resource controls to locate the resource control where the local set is tied in some manner to the process. The process searches a global set of controls tied to a larger number of entities in the operating system or to the entire operating system. In another embodiment the operating system determines whether a resource associated with the resource control is active. If it is active, the resource control from the global set is loaded to a local set of controls associated with the entity. In another embodiment, the operating system notifies numerous other entities in the operating system when there is a violation of a limiting value by the process. In yet another embodiment, when the newly added software is first encountered by the process, the resource controls are registered with the operating system.

DETAILED DESCRIPTION OF SPECIFIC EMBODIMENTS

Reference will now be made in detail to some specific embodiments of the invention. Examples of specific embodiments are illustrated in the accompanying drawings. While the invention will be described in conjunction with these specific embodiments, it will be understood that it is not intended to limit the invention to any particular specific embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides a method of dynamically adding resource controls to an operating system. The methods described herein can handle the arrival of new operating system software, such as a driver, and integrate any resource controls of the new software into a larger set of existing resource controls in the operating system. This integration is usually accomplished during a first encounter of the newly added software by a specific operating system entity. These entities are typically processes, tasks, or projects.

The present invention also allows an entity, such as a process, to have an arbitrary number of resource control limits and actions associated with the control limits. These actions are triggered when the entity's usage of a controlled resource, such as stack size, exceeds a limiting value. These values and actions are also distinguishable from each other by privilege level and by time-stamp marking of activation. This information is stored along with the control values and action values in the resource control block. The privilege determines whether the process has the ability to change the control values and actions. The time stamp information indicates when the control value was last triggered (i.e. met or exceeded). Having an arbitrary number of limiting values and actions permits greater flexibility and sophistication with respect to functions such as resource usage monitoring and access to resources than resource control mechanisms in existing operating systems.

The methods of the present invention also notify multiple entities when an entity violates resource controls rather than only notifying the violating entity.

The arrival of new software in an operating system can be accompanied by additional resource controls in the newly added software. The present invention handles the discovery, loading, and recognition of the new resource controls. An operating system may be composed of local modules which can include, for example, on-disk files, network files, or perhaps other types of files such as Linux files. Each of these modules can potentially add new controls to the operating system. Resource controls contained within these modules can, through the methods of the present invention, be incorporated into the existing resource controls for the operating system.

A resource control associated with the operating system entity is information pertinent to resource management operations for that entity. While current operating systems apply limits to a process, resource controls could be applied to entities other than the process. In the present invention, resource controls are attached to processes, tasks, and projects. However, the present invention should not be limited to these entities or abstractions.

Figure 1A:
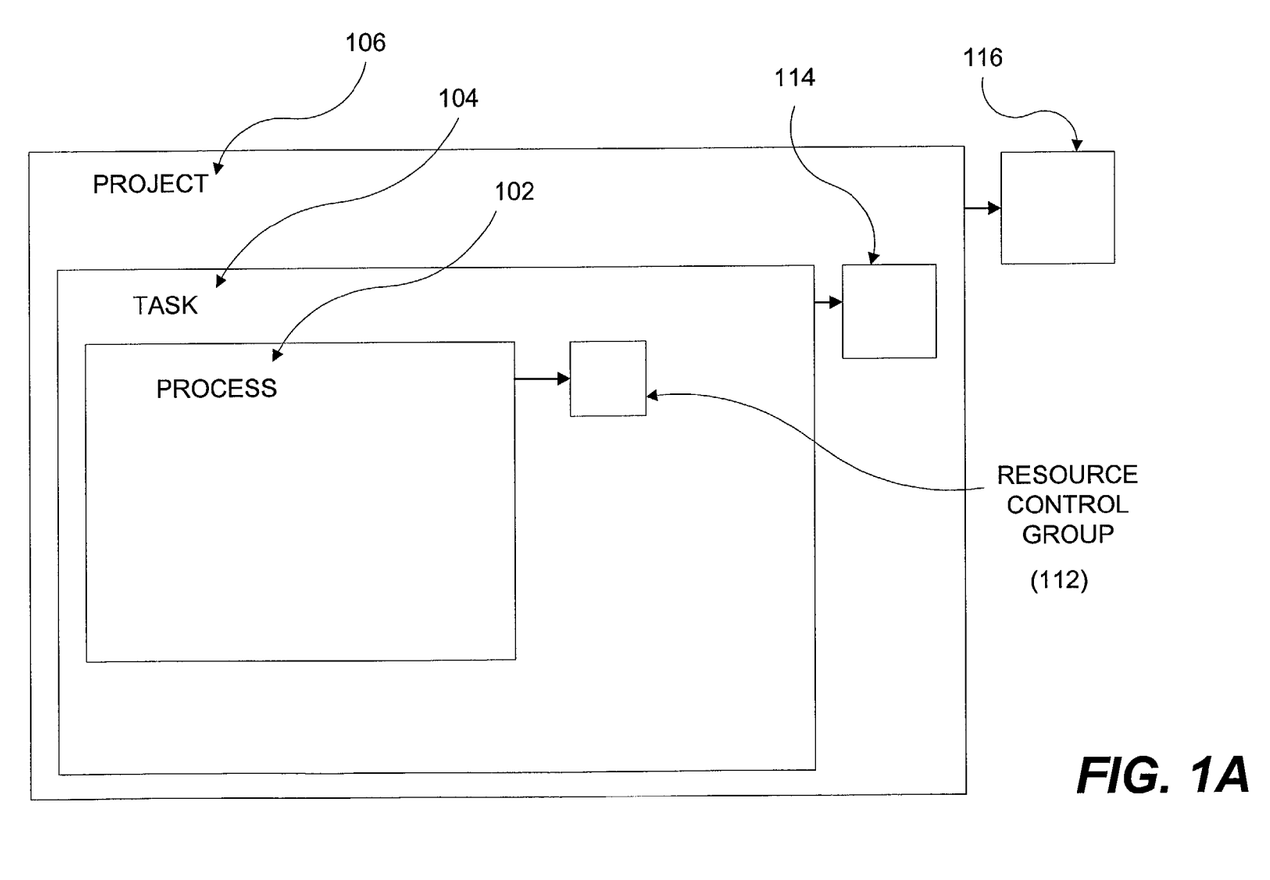
FIG. 1A is a diagram illustrating entities and interconnectivity of resource control groups.

As illustrated in FIG. 1A, a resource control group 112 is associated with a process 102. Process 102 is an executing computer program. A task 104 represents one or more related processes, and also may have a resource control group 114 associated with it. A project 106 is yet another entity which may have a resource control group 116 associated with it. The controls in the resource control groups described herein are not limited to a specific entity. For example, control group 116 is not limited to project 106, but may also be applied to task 104 or process 102. New resource controls can be added to the process, task, project or other type of entity as described below. Generally, resource controls are "active" as of the first request for a resource control by an entity after the resource control has been dynamically loaded into the operating system.

Figure 1B:
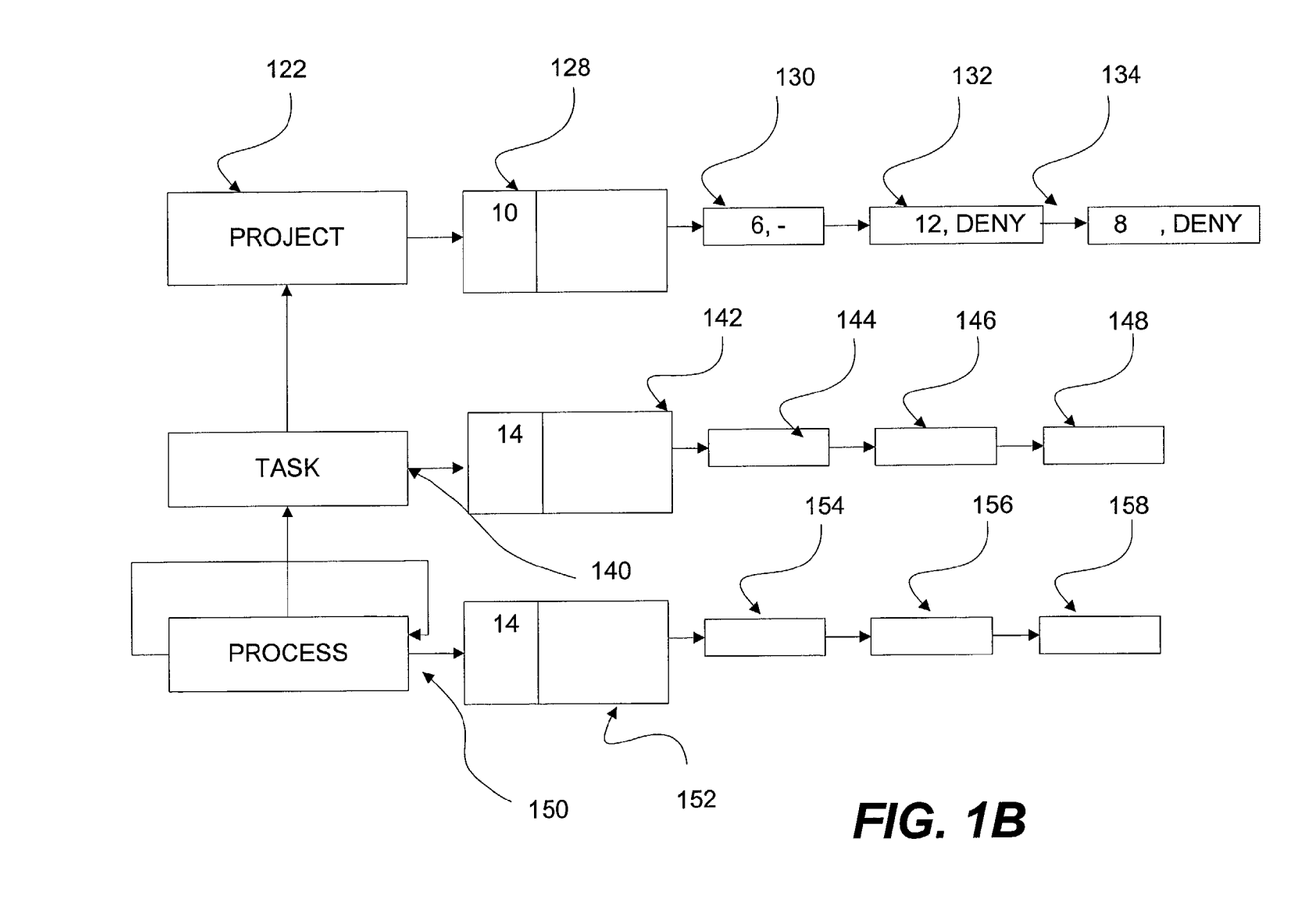
FIG. 1B is a diagram illustrating an entity model in accordance with the methods of the present invention.

FIG. 1B illustrates a process, task, and project model with attached resource control blocks. A project entity 122 is shown with the resource control ID of 10 appearing within its (local) resource control block 128. Boxes 130, 132, and 134 represent action value pairs for the specific resource control shown. The first value of the pair represents the control value limit with the second number representing an action. For example, in an embodiment, ID 10 may refer to maximum file descriptors. The initial limit is 6, followed by a second limit of 12, and a final limit of infinity (unlimited). Blocks 130, 132, and 134 provide the chain or listing of control limit values for the resource control, which here is identified with the ID value of 10. Resource control block 128 will have other ID numbers contained therein with a chain of control limit values associated with each resource control. Task 140 will have its own resource control block 142 and a chain of value blocks (144–148) for each resource control identified within the block 142. In similar fashion, process 150 will have a resource control block 152 with a chain of value blocks (154–158) corresponding to each resource control identified in the block 152. This example is provided for illustration purposes only and is not intended to limit the present invention to the structures depicted.

Figure 2:
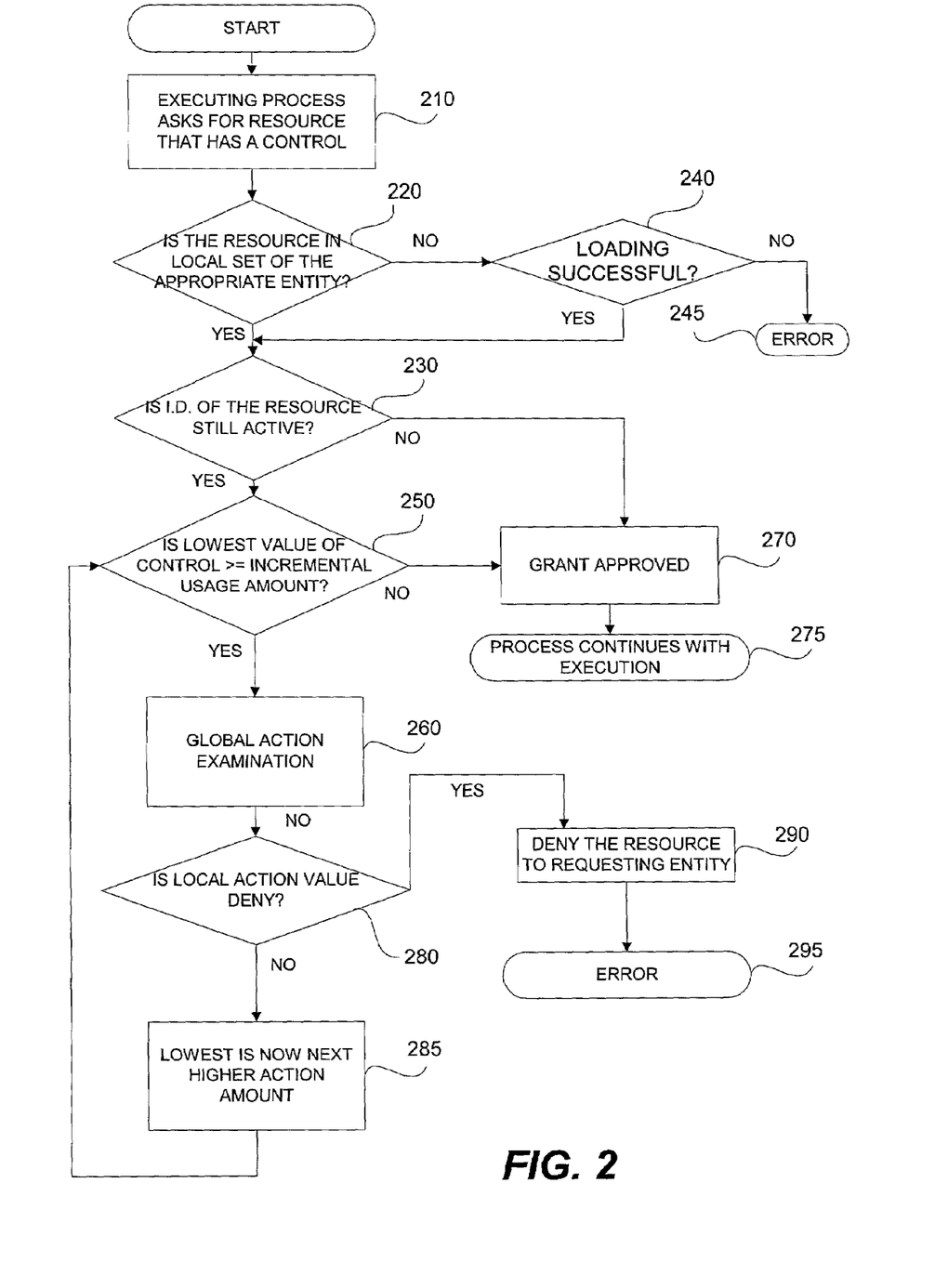
FIG. 2 is a flowchart illustrating a method of a process seeking resource controls in accordance with one embodiment of the present invention.

The method illustrated in the flowchart of FIG. 2 determines whether a resource exists and loads its associated controls. Initially, an executing process requests a resource that has a control (210). The process searches a local resource control group corresponding to that process for the requested resource (220). Generally, an ID is assigned to each resource control type when the resource control is added to the operating system. The ID permits a determination by the operating system as to whether the requested resource is for a task, process, or project. For example, when a process entity requests a resource, the resource control must be found on the resource control list for that entity. When the resource is not within the local set, i.e. is not in a resource control group such as group 112 attached to that process or other entity, the system will search and attempt to load the resource to the local list from a global set (240). Generally, a project 106 can access its own resource control group (116), as well as resource control groups falling within its hierarchy, such as resource control groups 114 and 112 attached to a task 104 and a process 102 in the project 106. The global set can be described as a directory, not constituting a set of resource controls but referencing or indexing at least one local list of resource controls. A global set contains or references all of the resource controls identified for the various entities including processes, tasks, and projects. Details as to the loading steps global control values to local groups or sets are provided in FIG. 3 below. Loading involves looking up the ID of the resource control in the global set and copying the global attributes (which include the resource control limits and associated actions) to the local set when the ID is found. When the attributes cannot be loaded, in other words when the resource control ID is not found in the global set, an error code is generated (245).

The resource controls from the local set, whether found in the initial search of the local set or later loaded from the global set, are then examined to determine whether the resource is still active (230). This is determined by examining the status field of the global resource control. If the resource is no longer active, i.e. the global status variable is set to zero or inactive, the resource is no longer present in the local set. This may occur, for example, after the resource has been unloaded to free up global resources for the system. If the resource is active, the resource is granted to the process (270) and the process continues executing (275). At this point the executing program leaves the local module which holds the files containing the resource.

When the resource is still active, the lowest limiting value for the resource control is tested against the incremental usage amount (250). The incremental usage amount is the current quantity of the controlled resource demanded by the process. If the incremental usage exceeds or equals the lowest limit value on the control, the action values associated with the resource control are examined starting first with the global action values (260). Global actions are visible to all entities on the system (such as a message to the system logging facility) whereas local actions are visible only to the entity causing the violation or a member of that entity (for tasks and projects, the visibility is extended to their member processes). As described below with reference to FIG. 6, the global actions will not stop the process from executing but will generate a report as to resource control usage for system monitoring. After the monitoring of the global action values is completed (260), local sets are examined (280) for the control value actions indicating whether a request for a resource should be denied. This enables the operating system to deny a resource to a requesting entity which would otherwise be entitled to obtain the resource. When the "deny" parameter has been set, the resource is denied to the requesting entity (290). A deny action is any action that prevents the entity from acquiring the resource it requested. In deny actions, the resource control value (limit) remains active in that the process never actually exceeded the threshold provided by the resource control value. An error message will then typically be generated by the operating system (295). If the resource control action values associated with the local set are set to "deny" (280), control is passed to block 290 and an error code is generated by the operating system (295). When, however, the local action values are not set to "deny", the next higher control value limit replaces the previously set value (285).

Control at this point passes back to block 250 to again compare the usage amount with the "new" lowest value of resource control. This loop permits implementation of an arbitrary number of limits in lieu of the soft and hard limits present in current operating systems. While current systems present only two limits, the present invention can provide an arbitrary number of limits and values. The system can be configured to send a progression of notices, i.e. a number of so-called "yellow" alert limits. For example, a first limit may be set when an entity reaches CPU cycle usage corresponding to the resource control value of 1000 CPU seconds, and a second limit set when the entity usage hits 1200 CPU seconds. Finally, at 1500 CPU seconds the operating system may send out a fatal signal. This progression of notices can be sent locally to the process and globally to all entities in the operating system.

Figure 3:
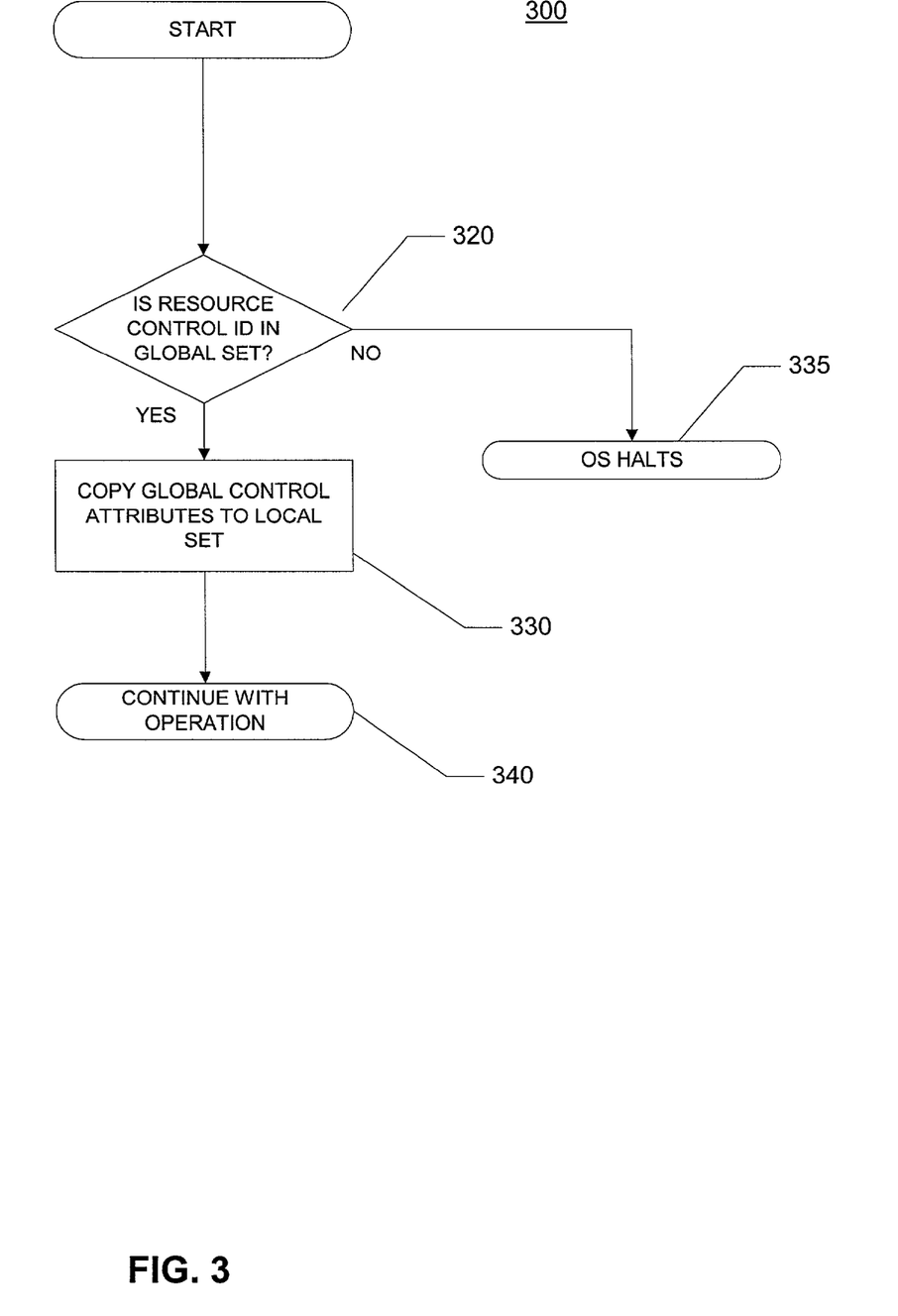
FIG. 3 is a flowchart illustrating a method of loading a resource control in accordance with the method shown in FIG. 2.

Further details as to the procedures occurring within specified blocks are illustrated in FIGS. 3–6 and described below. FIG. 3 illustrates further details as to the loading procedure involved in loading resource control values from the global set to the local set. This diagram provides greater detail as to the procedures occurring within block 240 of FIG. 2. As depicted in FIG. 2, once the search has failed to discover the resource in the local set of the appropriate entity (220), i.e. the resource set of the process when it is the requesting entity, the system will attempt to load resource control values associated with other entities (i.e. other tasks, processes, or projects).

Process 300 identified in FIG. 3 is the loading process. Initially, a search for the resource control ID in the global set of resource controls takes place (320). If the ID is located, the global control attributes are copied to the local set for the entity, making them now available to the entity (330). Global control attributes are values defined by default for a particular resource control when that resource is first encountered by the operating system. At the time of loading, the only default value placed on controls is infinity. Control resources may, however, have more than one global control attribute value associated with them. The process execution then continues, passing control back to block 230 in FIG. 2 (340). If the resource control ID is not discovered in the global set of resource controls, the operating system halts (335).

Figure 4:
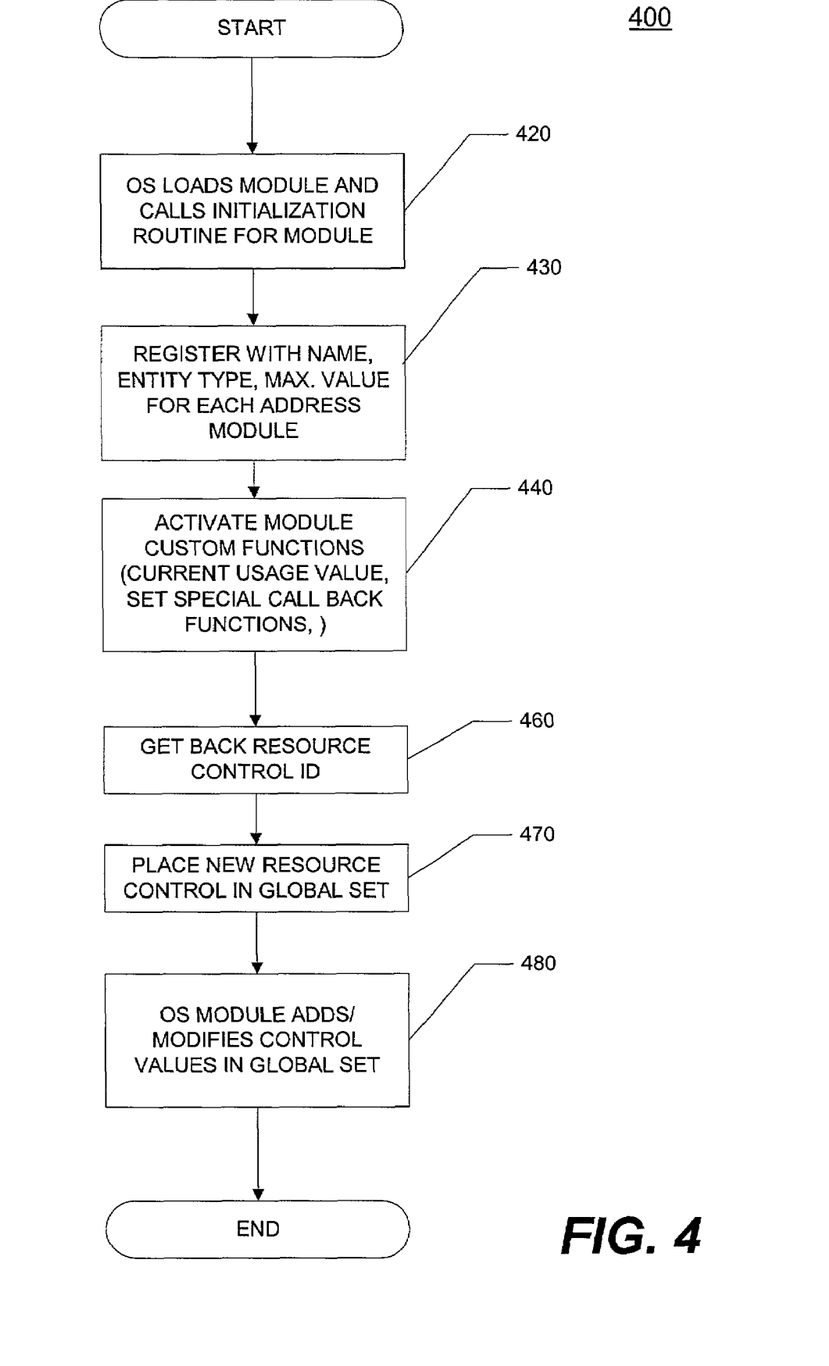
FIG. 4 is a flowchart illustrating registration of a resource control in accordance with the method shown in FIG. 2.

FIG. 4 illustrates a process involved in registering resource controls. Registration 400 occurs when first introducing a resource to the operating system. This enables the entities to be aware of the extended capabilities of the operating system. Initially the operating system loads the added software module and calls an initialization routine for the module (420). This routine will contain a register file, which contains an identification of the added resource controls. For each address module, the name, entity type (such as process, task, or project) and maximum value for each address module is stored (430). Modules also have custom functions that are executed (440). These custom functions include current usage values and the setting of special call back functions. These custom functions are necessary for communicating information necessary for testing as in block 250 depicted in FIG. 2, for example. A custom function capable of communicating the number of file descriptors must also be provided. The registration process produces a unique identification number for use by the module itself (460). While the foregoing procedure advises the operating system of the new resource control, in order to make the resource control accessible by other entities (other than the local entity), the new resource control identification number and all of the resources attributes are then placed in the global set (470). The operating system has the capability of adding or modifying the control values in the global set (480). All attributes can be modified except that upper limit values are not likely to be modified. The operating system associates the control value attributes using the resource control ID.

Figure 5:
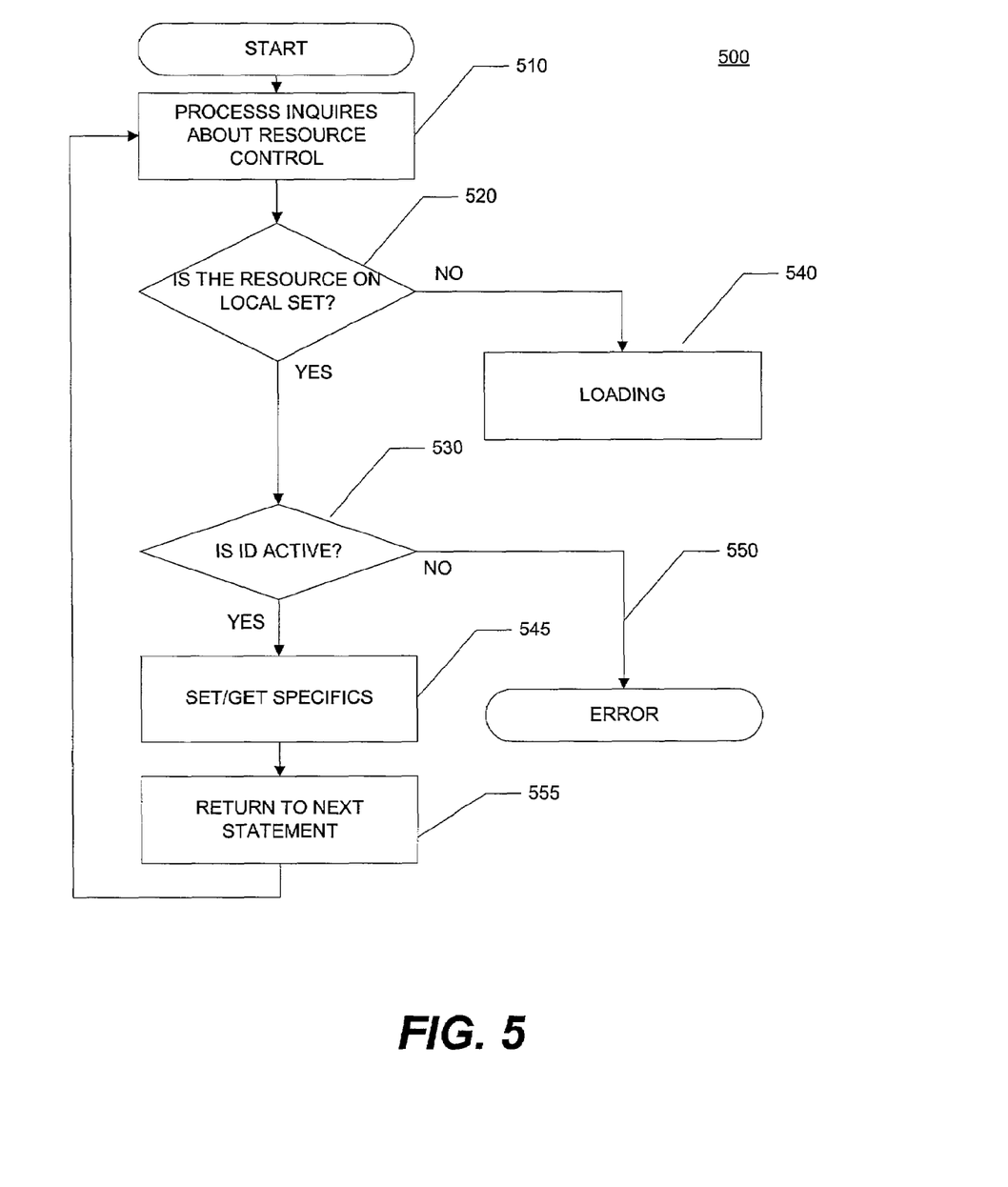
FIG. 5 is a flowchart illustrating setting and obtaining attributes of resources in accordance with the method shown in FIG. 2.

FIG. 5 illustrates in greater detail the steps involved in setting or getting attributes of resource controls. This operation permits applications to set the values of resource controls on the various resources. Initially, an executing process requests a resource that has a control (510). The process searches a local set corresponding to the appropriate entity (process, task, or project) for the requested resource (520). When the resource is not within the local set, i.e. is not on a resource control list attached to that process or other entity, the system will search and attempt to load the resource to the local list from a global set (540). The resources from the local set, whether found in the initial search of the local set or later loaded from the global set, are then examined to determine whether the ID of the resource is still active (530). Once a determination is made that the ID of the resource is still active (530), the operating system will set or get specific values for the control resources (545). The local resource control values are set from the global set values placed at the time of resource control registration. The global set contains all of the active resource controls as well as the inactive controls (controls that were registered but whose providing module has been unloaded). Unloaded controls are unknown. After completion of the setting or getting of attributes for the resource controls, the process flow returns to the next statement in the executing program (555).

Figure 6:
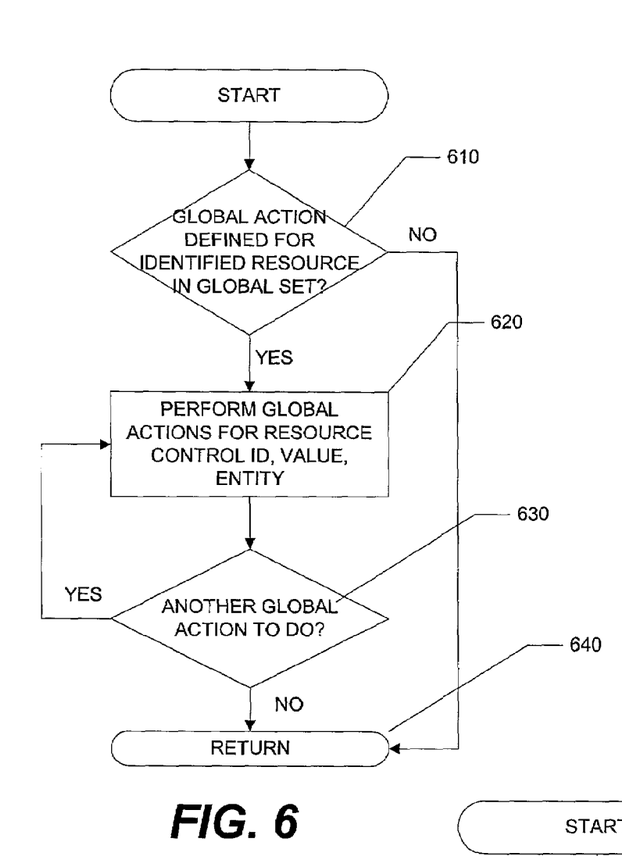
FIG. 6 is a flowchart illustrating global actions of resource controls in accordance with the method shown in FIG. 2.

FIG. 6 illustrates in greater detail the global action occurring within block 260, as depicted in FIG. 2. The global action permits the administrator to monitor controlled resource usage by the various entities. The global action is a reporting feature and doesn't interfere with execution of the process. It permits observation as to the resource behavior over the entire operating system. Using the resource control ID as an index value, a quick link is taken back to the global set The quick link points from the resource control on the local set back to the resource control on the global set. This makes the various status checks for activity or global actions easy to accomplish. The global set has a list of all resource controls. The list includes resource controls for process, task, project, and other entities along with their names. The resource control list for the process (i.e., the local set) includes only a small portion of the global set. The global action is performed prior to the local action. A determination is made as to whether a global action is defined for the identified resource in the global set (620). When any one control value has been exceeded (or triggered), the global action in the global set is performed (620). Where global actions are not defined for the identified resource, control returns to the program execution (640). If other global actions remain to be performed, they will be consecutively performed before flow returns to the program execution(620). Where no more global actions remain to be performed, the flow returns to the program execution (640). If no control limit values are exceeded then the local action is performed.

Figure 7:
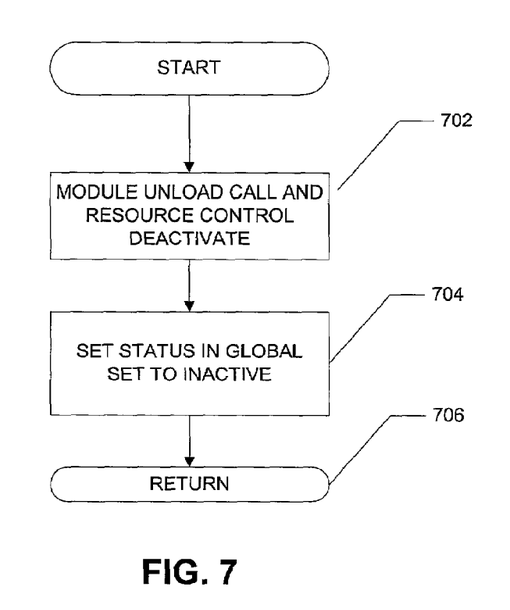
FIG. 7 is a flowchart illustrating module unloading of resource controls in accordance with the method shown in FIG. 2.

Deactivation of a resource control is a relatively simple procedure as illustrated in the flowchart of FIG. 7. In response to a trigger from a module unload call (702), the status in the global set is set to inactive (704). Control is then returned to the main program (706). Unloading can be performed at any point and is necessary to resolve conflicting demands placed on global resources. In unloading a module, the system is aware of the location (of instruction) of the running threads in the kernel and waits for any threads to exit the code provided by the module before finally removing it from the system. In resource controls the module-specific callbacks are reset so that resource controls associated with the module no longer call into the module itself but into the callback mechanism that approves all requests.

While the invention has been particularly shown and described with reference to specific embodiments, it will be understood by those skilled in the art that other details may be made without departing from the spirit or scope of the invention. For example, many different types of display and interface devices can be used other than those listed in the foregoing embodiments. Furthermore, certain terminology has been used to aid in the description of the embodiments but was not intended to limit the present invention. Therefore, in view of the foregoing, the scope of the invention should be determined by reference to the appended claims.

What is claimed is:

1. A method of dynamically checking a set of one or more resource controls associated with resource consumption of newly added software to an operating system, the method comprising:

while the operating system is executing, integrating resource controls associated with the newly added operating system software into a set of one or more resource controls already associated with the operating system before addition of the newly added operating system software, wherein integrating the resource controls associated with the added operating system software includes registering the resource controls associated with the newly added operating software with the operating system, wherein each of one or more resource controls in the integrated set of one or more resource controls identifies one or more resources, each of the set of resource controls having one or more limiting values associated therewith;

in response to a request for one of the resources by an operating system entity, determining whether usage of one of the one or more resources by the operating system entity exceeds one of the limiting values in the integrated set of one or more resource controls, corresponding to the requested one of the resources; and granting the requested one of the resources to the operating system entity if the limiting value has not been exceeded.

2. A method as recited in claim 1 further comprising searching by the operating system entity a first set of resource controls to locate the one of the set of resource controls.

3. A method as recited in claim 2 further comprising searching by the operating system entity a second set of resource controls associated with a plurality of entities to locate the one of the set of resource controls.

4. A method as recited in claim 1 further comprising determining whether the resource associated with the resource control is active.

5. A method as recited in claim 1 further comprising loading the one of the set of resource controls from a global set of controls to a local set of controls associated with the operating system entity.

6. A method as recited in claim 1 further comprising notifying a plurality of other entities when there is a violation of one of the limiting values by the operating system entity.

7. A method as recited in claim 1 wherein the operating system entity is one of a process, task, and a project in the operating system.

8. A method as recited in claim 1 further comprising manually changing the limiting value as desired.

9. The method as recited in claim 1, father comprising: resetting the limiting value of the one of the set of resource controls to another threshold value.

10. The method as recited in claim 1, further comprising: dynamically adding the set of resource controls to a second set of resource controls.

11. The method as recited in claim 1, further comprising: removing the set of resource controls from a second set of resource controls.

12. The method as recited in claim 1, further comprising: adding the set of resource controls to a global set of resource controls maintained by the operating system, thereby enabling operating system entities of the operating system to be aware of additional capabilities of the operating system added by the set of resource controls and the associated newly added software module.

13. The method as recited in claim 12, wherein adding the set of resource controls to a global set of resource controls maintained by the operating system is performed when encountering the newly added software is executed for a first time.

14. The method as recited in claim 12, wherein adding the set of resource controls to a global set of resource controls maintained by the operating system is performed when the newly added software is loaded.

15. The method as recited in claim 12, further comprising: removing the set of resource controls from the global set of resource controls.

16. The method as recited in claim 15, wherein removing the set of resource controls from the global set of resource controls is performed when the newly added software is unloaded.

17. The method as recited in claim 1, further comprising: adding the set of resource controls to a local set of resource controls associated with an operating system entity within the operating system.

18. The method as recited in claim 1, wherein determining, triggering and granting are performed by the operating system.

19. A method as recited in claim 1, further comprising: if the one limiting value has been exceeded, causing execution of one or more actions associated with the one limiting value.

20. The method as recited in claim 1, wherein: integrating resource controls associated with the newly added operating system software includes, by the operating system, calling an initialization routine associated with the newly added operating system software.

21. The system as recited in claim 20, wherein: the initialization routine includes processing a file contained by the routine that characterizes the resource controls associated with the newly added operating system software.

22. The system as recited in claim 21, wherein: processing the file includes associating a resource identification for the newly added operating system entity with control value attributes usable by the resource controls of the integrated set of one or more resource controls.

23. A system for dynamically checking a set of one or more resource controls associated with resource consumption of newly added software to an operating system, the system comprising:

means for, while the operating system is executing, integrating resource controls associated with the newly added operating system software into a set of one or more resource controls already associated with the operating system before addition of the newly added operating system software, wherein integrating the resource controls associated with the added operating system software includes registering the resource controls associated with the newly added operating software with the operating system, wherein each of one or more resource controls in the integrated set of one or more resource controls identifies one or more resources, each of the set of resource controls having one or more limiting values associated therewith;

means for, in response to a request for one of the resources by an operating system entity, determining whether usage of one of the one or more resources by the operating system entity exceeds one of the limiting values in the integrated set of one or more resource controls, corresponding to the requested one of the resources, and means for granting the requested one of the resources to the operating system entity if the limiting value has not been exceeded.

24. The system as recited in claim 23, wherein the apparatus further comprises:

means for, if the one limiting value has been exceeded, causing execution of one or more actions associated with the one limiting value.

25. A computer-readable medium containing programmed instructions arranged to dynamically check a set of one or more resource controls associated with resource consumption of newly added software to an operating system, the computer-readable medium including programmed instructions for:

while the operating system is executing, integrating resource controls associated with the newly added operating system software into a set of one or more resource controls already associated with the operating system before addition of the newly added operating system software, wherein integrating the resource controls associated with the added operating system software includes registering the resource controls associated with the newly added operating software with the operating system, wherein each of one or more resource controls in the integrated set of one or more resource controls identifies one or more resources, each of the set of resource controls having one or more limiting values associated therewith;

in response to a request for one of the resources by an operating system entity, determining whether usage of one of the one or more resources by the operating system entity exceeds one of the limiting values in the integrated set of one or more resource controls corresponding to the requested one of the resources; and     granting the requested one of the resources to the operating system entity if the limiting value has not been exceeded.

26. A system for dynamically checking a set of one or more resource controls associated with resource consumption of newly added software to an operating system comprising:

one or more processors; and a computer readable medium storing a program for execution by the one or more processors comprising:

computer code that, while the operating system is executing, integrates resource controls associated with the newly added operating system software into a set of one or more resource controls already associated with the operating system before addition of the newly added operating system software, wherein integrating the resource controls associated with the added operating system software includes registering the resource controls associated with the newly added operating software with the operating system, wherein each of one or more resource controls in the integrated set of one or more resource controls identifies one or more resources, each of the set of resource controls having one or more limiting values associated therewith;

computer code that, in response to a request for one of the resources by an operating system entity, determines whether usage of one of the one or more resources by the operating system entity exceeds one of the limiting values in the integrated set of one or more resource controls corresponding to the requested one of the resources; and     computer code that grants the requested one of the resources to the operating system entity if the limiting value has not been exceeded.

* * * * *

UNITED STATES PATENT AND TRADEMARK OFFICE
CERTIFICATE OF CORRECTION

| | | |
|---|---|---|
| PATENT NO. | : 7,086,060 B2 | Page 1 of 1 |
| APPLICATION NO. | : 09/785022 | |
| DATED | : August 1, 2006 | |
| INVENTOR(S) | : Stephen C. Hahn | |

It is certified that error appears in the above-identified patent and that said Letters Patent is hereby corrected as shown below:

In line 1 of claim 9 (column 9, line 38) change "father comprising" to --further comprising--.

Signed and Sealed this

Twenty-first Day of November, 2006

JON W. DUDAS
*Director of the United States Patent and Trademark Office*